(12) United States Patent  
Sasaki et al.

(10) Patent No.: US 8,416,229 B2
(45) Date of Patent: Apr. 9, 2013

(54) LIQUID CRYSTAL DISPLAY DEVICE AND MANUFACTURING METHOD THEREOF

(75) Inventors: Takahiro Sasaki, Osaka (JP); Kunihiro Tashiro, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/675,237

(22) PCT Filed: Jul. 4, 2008

(86) PCT No.: PCT/JP2008/001783
§ 371 (c)(1),
(2), (4) Date: Feb. 25, 2010

(87) PCT Pub. No.: WO2009/066402
PCT Pub. Date: May 28, 2009

(65) Prior Publication Data
US 2011/0216053 A1    Sep. 8, 2011

(30) Foreign Application Priority Data
Nov. 22, 2007   (JP) .................... 2007-303486

(51) Int. Cl.
*G09G 5/00* (2006.01)

(52) U.S. Cl.
USPC .............................. 345/211; 345/93; 345/212

(58) Field of Classification Search ........... 345/87–97, 345/204–215
See application file for complete search history.

(56) References Cited

U.S. PATENT DOCUMENTS

| 7,420,647 | B2 | 9/2008 | Nakahata |
| 2003/0043336 | A1 | 3/2003 | Sasaki et al. |
| 2003/0112393 | A1 | 6/2003 | Watanabe et al. |
| 2003/0151703 | A1 | 8/2003 | Nakanishi et al. |
| 2004/0223112 | A1 | 11/2004 | Taniguchi et al. |
| 2006/0244881 | A1 | 11/2006 | Sasaki et al. |
| 2011/0193769 | A1* | 8/2011 | Ohgami et al. .................. 345/87 |
| 2012/0242610 | A1* | 9/2012 | Yasumatsu .................... 345/173 |
| 2012/0306732 | A1* | 12/2012 | Sugihara et al. ............... 345/88 |

FOREIGN PATENT DOCUMENTS

| JP | 11-249169 | 9/1999 |
| JP | 2000-047238 | 2/2000 |
| JP | 2003-149647 | 5/2003 |
| JP | 2004-302013 | 10/2004 |
| JP | 2005-024649 | 1/2005 |

OTHER PUBLICATIONS

International Search Report for PCT/JP2008/001783, mailed Aug. 19, 2008.
English translation of the Chinese Office Action mailed Jan. 27, 2011 in Chinese Application 200880105109.4.

* cited by examiner

*Primary Examiner* — Vijay Shankar
(74) *Attorney, Agent, or Firm* — Nixon & Vanderhye, P.C.

(57) ABSTRACT

A liquid crystal display device includes: first and second substrates positioned so as to face each other; and a liquid crystal layer interposed between the first and second substrates, and containing a polymerizable component that is polymerized by light or heat. The polymerizable component of the liquid crystal layer is polymerized with a predetermined voltage being applied to a region corresponding to those pixels whose transmittance-drive voltage characteristics are shifted toward higher voltages in a normal drive operation, where the predetermined voltage is applied so that the transmittance-drive voltage characteristics are shifted toward lower voltages by an amount equal to or larger than an amount of the shift toward higher voltages.

4 Claims, 7 Drawing Sheets

LIQUID CRYSTAL DISPLAY DEVICE AND MANUFACTURING METHOD THEREOF

This application is the U.S. national phase of International Application No. PCT/JP2008/001783 filed 4 Jul. 2008, which designated the U.S. and claims priority to Japan Application No. 2007-303486 filed 22 Nov. 2007, the entire contents of each of which are hereby incorporated by reference.

TECHNICAL FIELD

The present invention relates to liquid crystal display (LCD) devices and manufacturing methods thereof.

BACKGROUND ART

Manufacturing processes of thin film transistor substrates (TFT substrates) for use in, e.g., LCD devices typically include a process of exposing a photoresist to light to pattern each layer. In this process, a division exposure method is often used to accurately pattern each layer. The division exposure method is a method in which a TFT substrate is divided into a plurality of exposure regions to be exposed by a division exposure system.

When using such a division exposure method, a displacement of a pattern (a displacement of a pattern in a layer) and/or an overlay misalignment (a pattern misalignment between layers) sometimes occurs at the boundary between the divided exposure regions due to manufacturing variation. If such a displacement of a pattern and/or an overlay misalignment occurs, the parasitic capacitance between electrodes, and the like vary at the division boundary. If the parasitic capacitance varies in this manner, a voltage that is applied to the liquid crystal layer also varies accordingly, whereby the light transmittance of the pixels varies at the division boundary. If the light transmittance varies in this manner, that region is visually recognized as display unevenness, which adversely affects display quality of LCD devices.

As a solution to this problem, Patent Document 1, for example, discloses a technique of making display unevenness less visually recognizable by randomly positioning pixels having different transmittances near the division boundary.

In recent years, there has been a strong need to increase brightness of display devices, and the like. In response to this need, multi-domain vertically aligned mode liquid crystal display devices (MVA-LCDs) having excellent viewing angle characteristics have been studied and developed by vertically aligning liquid crystal molecules having negative dielectric anisotropy, and providing protrusions and/or slits on substrates as a structure for controlling alignment of the liquid crystal molecules. As disclosed in Patent Document 2, a polymer sustained alignment (PSA) technique is effective in enabling both higher brightness and faster response to be implemented in the MVA-LCDs. In the PSA technique, a liquid crystal composition, which contains a polymerizable component such as a monomer or an oligomer in a liquid crystal material, is sealed between substrates. A voltage is applied between the substrates to tilt liquid crystal molecules, and in this state, the monomer or the like is polymerized to form a polymer. This provides a liquid crystal layer that is tilted in a predetermined tilt direction by application of a voltage, whereby the tilt direction of the liquid crystal molecules can be defined.

CITATION LIST

Patent Document

PATENT DOCUMENT 1: Japanese Published Patent Application No. H11-249169

PATENT DOCUMENT 2: Japanese Published Patent Application No. 2003-149647

SUMMARY OF THE INVENTION

Technical Problem

When using the above division exposure method to perform a patterning process on a TFT substrate in, e.g., the LCD devices using the above PSA technique, it is necessary to provide a margin at the boundary between the division exposure regions to allow for an overlay misalignment and the like. However, providing such a margin can reduce the aperture ratio of the LCD devices.

Solution to the Problem

The present invention was developed in view of the above problem, and it is an object of the present invention to provide a liquid crystal display device, which effectively reduces display unevenness, and implements satisfactory display characteristics and a satisfactory aperture ratio, and a manufacturing method thereof.

A liquid crystal display device according to the present invention includes: first and second substrates positioned so as to face each other; a liquid crystal layer interposed between the first and second substrates, and containing a polymerizable component that is polymerized by light or heat; a plurality of pixel electrodes formed over the first substrate, for controlling a tilt angle of liquid crystal molecules on a pixel region-by-pixel region basis according to an applied voltage; and a counter electrode formed over the second substrate, and positioned so as to face the plurality of pixel electrodes, wherein the polymerizable component of the liquid crystal layer is polymerized with a predetermined voltage being applied to a region corresponding to those pixels whose transmittance-drive voltage characteristics (hereinafter referred to as the "T-V characteristics") are shifted toward higher voltages in a normal drive operation, where the predetermined voltage is applied so that the T-V characteristics are shifted toward lower voltages by an amount equal to or larger than an amount of the shift toward higher voltages.

As used herein, the phrase "so that the T-V characteristics are shifted toward lower voltages by an amount equal to or larger than an amount of the shift toward higher voltages" means "so that the T-V characteristics are shifted toward lower voltages by an amount substantially equal to or larger than an amount of the shift toward higher voltages."

In the liquid crystal display device of the present invention, the first substrate may include TFT devices electrically connected to the pixel electrodes, respectively, and gate lines and source lines for driving the pixel electrodes via the TFT devices, respectively, and the polymerizable component of the liquid crystal layer may be polymerized with a voltage being applied to the liquid crystal layer to drive the pixel electrodes, where the voltage application is performed by periodically and simultaneously applying a pulsed voltage to the gate lines corresponding to all of the plurality of pixel electrodes to turn on/off the plurality of TFT devices simultaneously, and the voltage that is applied to the liquid crystal layer during a gate-off period is higher than the voltage that is applied to the liquid crystal layer during a gate-on period.

A method for manufacturing a liquid crystal display device according to the present invention includes the steps of: preparing first and second substrates positioned so as to face each other, a liquid crystal layer interposed between the first and second substrates, and containing a polymerizable component that is polymerized by light or heat, a plurality of pixel electrodes formed over the first substrate, for controlling a tilt angle of liquid crystal molecules on a pixel region-by-pixel region basis according to an applied voltage, and a counter electrode formed over the second substrate, and positioned so as to face the plurality of pixel electrodes; and polymerizing the polymerizable component of the liquid crystal layer with a predetermined voltage being applied to a region corresponding to those pixels whose T-V characteristics are shifted toward higher voltages in a normal drive operation, where the predetermined voltage is applied so that the T-V characteristics are shifted toward lower voltages by an amount equal to or larger than an amount of the shift toward higher voltages.

In the method of the present invention, the first substrate may include TFT devices electrically connected to the pixel electrodes, respectively, and gate lines and source lines for driving the pixel electrodes via the TFT devices, respectively, and the polymerizable component of the liquid crystal layer may be polymerized with a voltage being applied to the liquid crystal layer to drive the pixel electrodes, where the voltage application is performed by periodically and simultaneously applying a pulsed voltage to the gate lines corresponding to all of the plurality of pixel electrodes to turn on/off the plurality of TFT devices simultaneously, and the voltage that is applied to the liquid crystal layer during a gate-off period is higher than the voltage that is applied to the liquid crystal layer during a gate-on period.

Advantages of the Invention

A liquid crystal display device, which effectively reduces display unevenness, and implements satisfactory display characteristics and a satisfactory aperture ratio, and a manufacturing method thereof can be provided according to the present invention.

DESCRIPTION OF REFERENCE CHARACTERS

10 LCD Device
11 LCD Panel
13 TFT Substrate
14 CF Substrate
15 Liquid Crystal Layer
16 Gate Line
17 Source Line
18 Auxiliary Capacitor Line
21 TFT
29 Counter Electrode
30 Pixel Electrode
40 Parasitic Capacitance

DESCRIPTION OF EMBODIMENTS

The configuration of an LCD device according to an embodiment of the present invention, and a manufacturing method of the LCD device, and the principles of reducing display unevenness in the LCD device will be described in detail below with reference to the accompanying drawings. Note that the present invention is not limited to the following embodiment.

(Configuration of the LCD Device)

Figure 1:
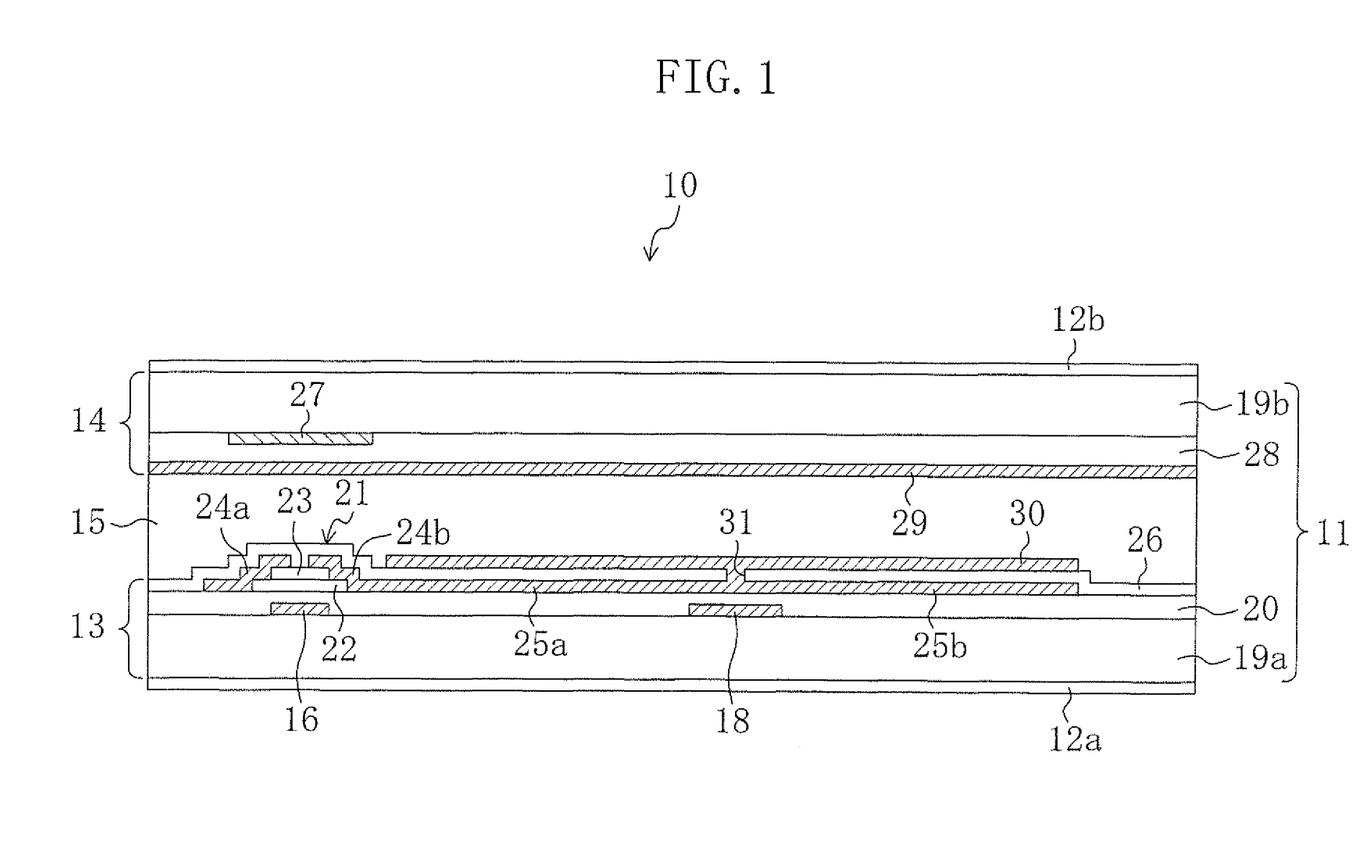
FIG. 1 is a cross-sectional view of an LCD device according to an embodiment of the present invention.

FIG. 1 is a cross-sectional view of an LCD device 10 according to an embodiment of the present invention. The LCD device 10 is formed by an LCD panel 11 and a backlight (not shown).

The LCD panel 11 includes a TFT substrate (a first substrate) 13, a color filter (CF) substrate (a second substrate) 14, and a liquid crystal layer 15 interposed therebetween, where the TFT substrate 13 includes thin film transistor (TFT) devices, and polarizers 12a, 12b are respectively formed on the respective outer surfaces of the TFT substrate 13 and the CF substrate 14.

Figure 2:
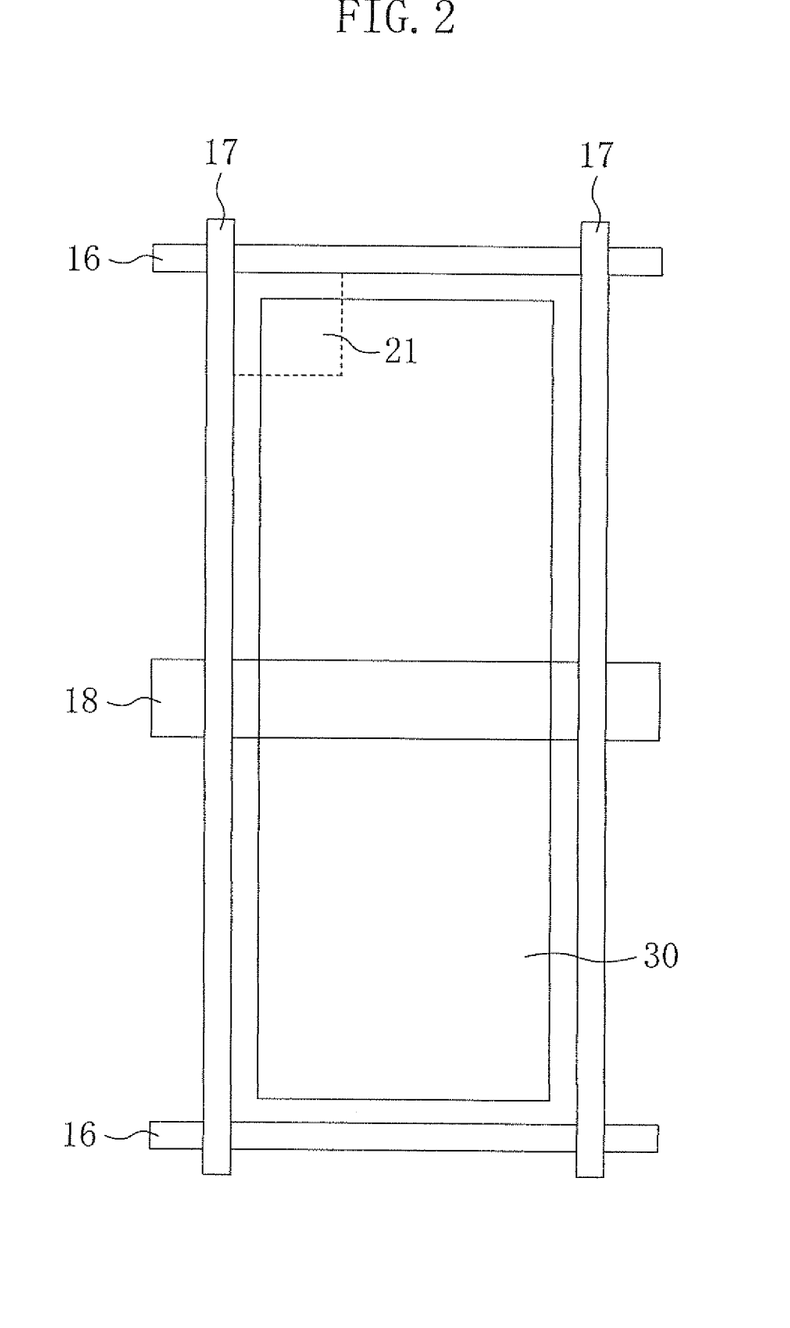
FIG. 2 is a plan view of a TFT substrate according to the embodiment of the present invention.

As shown in FIG. 2, a plurality of gate lines 16 extending in an X-axis direction, and a plurality of source lines 17 extending in a Y-axis direction are formed in the TFT substrate 13. Each rectangular region defined by the gate lines 16 and the source lines 17 is a pixel region. Auxiliary capacitor lines 18 are also formed in the TFT substrate 13. The auxiliary capacitor lines 18 extend parallel to the gate lines 16, and each auxiliary capacitor line 18 extends laterally across the respective centers of corresponding ones of the pixel regions.

In each pixel region, the gate line 16 and the auxiliary capacitor line 18 are formed on a glass substrate 19a that serves as a base of the TFT substrate 13.

A gate insulating film 20, which is made of, e.g., $SiO_2$, SiN, or the like, is formed over the gate line 16 and the auxiliary capacitor line 18. A semiconductor film (e.g., an amorphous silicon film or a polysilicon film) 22, which serves as an active layer of the TFT 21, is formed in a predetermined region on the gate insulating film 20. A channel protective film 23, which is made of SiN or the like, is formed on the semiconductor film 22, and a drain electrode 24a and a source electrode 24b of the TFT 21 are formed on both sides of the channel protective film 23 in the Y-axis direction.

The source line 17 connected to the source electrode 24b of the TFT 21, a control electrode 25a and an auxiliary capacitor electrode 25b which are connected to the drain electrode 24a of the TFT 21, are formed on the gate insulating film 20. The auxiliary capacitor electrode 25b is formed so as to face the auxiliary capacitor line 18 with the gate insulating film 20 interposed therebetween. An auxiliary capacitor is formed by the auxiliary capacitor line 18, the auxiliary capacitor electrode 25b, and the gate insulating film 20 located therebetween. The control electrode 25a is positioned along the centerline of the pixel region, which is parallel to the Y-axis. The auxiliary capacitor electrode 25b is positioned along the centerline of the pixel region, which is parallel to the X-axis.

An insulating film 26, which is made of, e.g., SiN, is formed over the source line 17, the drain electrode 24a, the source electrode 24b, the control electrode 25a, and the auxiliary capacitor electrode 25b.

A pixel electrode 30, which is made of a transparent conductor such as indium tin oxide (ITO) or indium zinc oxide (IZO), is provided in each pixel region on the insulating film 26. The pixel electrode 30 is electrically connected to the auxiliary capacitor electrode 25b via a contact hole 31 formed in the insulating film 26.

A black matrix (a light-shielding film) 27, color filters 28, and a counter electrode 29 are formed over the surface located on the liquid crystal layer 15 side of a glass substrate 19b that serves as a base of the CF substrate 14.

The black matrix 27 is made of a metal such as Cr (chromium), or a black resin, and is positioned so as to face the gate line 16, the source line 17, and the TFT 21 of the TFT substrate 13. There are three kinds of color filters 28, which are red (R), green (G), and blue (B), and a color filter of one of the three colors is positioned in each sub-pixel. Every three adjoining sub-pixels of red, green, and blue form a pixel, thereby making it possible to display images in various colors.

The counter electrode 29 is made of a transparent conductor such as ITO or IZO, and is positioned on the color filters 28. A vertical alignment film (not shown), which is made of polyimide or the like, is formed on the counter electrode 29.

The liquid crystal layer 15 is made of liquid crystal molecules having negative dielectric anisotropy, and contains a polymerizable component (a monomer or an oligomer) which is polymerized by light or heat. The polymerizable component of the liquid crystal layer 15 is polymerized with a predetermined voltage being applied to a region corresponding to those pixels whose T-V characteristics are shifted toward higher voltages in a normal drive operation. At this time, the predetermined voltage is applied so that the T-V characteristics are shifted toward lower voltages by an amount equal to the shift amount toward higher voltages.

(Manufacturing Method of the LCD Device 10)

A method for manufacturing the LCD device 10 according to the embodiment of the present invention will be described. Note that the manufacturing method described below is by way of example only, and the LCD device 10 of the present invention is not limited to LCD devices manufactured by the following method.

First, a glass substrate 19a is prepared as a base of a TFT substrate 13. Then, a metal film is formed on the glass substrate 19a. The metal film is formed by, e.g., laminating Ti and Al. The metal film is patterned by a photolithography method to form gate lines 16 and auxiliary capacitor lines 18.

Next, a gate insulating film 20, which is made of e.g., an insulating material such as $SiO_2$ or SiN, is formed over the entire upper surface of the glass substrate 19a. A semiconductor film (an amorphous silicon film or a polysilicon film) 22, which serves as an active layer of the TFTs 21, is formed in a predetermined region on the gate insulating film 20.

Then, a SiN film is formed over the entire upper surface of the glass substrate 19a. The SiN film is patterned by a photolithography method to form a channel protective film 23 on a region that serves as a channel in the semiconductor film 22.

Subsequently, an ohmic contact layer (not shown), which is made of a semiconductor film highly doped with impurities, is formed over the entire upper surface of the glass substrate 19a. Then, a metal film is formed over the glass substrate 19a by, e.g., sequentially laminating Ti, Al, and Ti in this order. The metal film and the ohmic contact layer are patterned by a photolithography method to form source lines 17, drain electrodes 24a, source electrodes 24b, control electrodes 25a, and auxiliary capacitor electrodes 25b.

Next, an insulating film 26, which is made of, e.g., an insulating material such as $SiO_2$ or SiN, is formed over the entire upper surface of the glass substrate 19a. Contact holes 31, each extending to a corresponding one of the auxiliary capacitor electrodes 25b, are formed in the insulating film 26.

Then, ITO is sputtered over the entire upper surface of the glass substrate 19a to form an ITO film. This ITO film is electrically connected to the auxiliary capacitor electrodes 25b via the contact holes 31, respectively. Subsequently, the ITO film is patterned by a photolithography method to form pixel electrodes 30.

Then, polyimide is applied to the entire upper surface of the glass substrate 19a to form an alignment film. The TFT substrate 13 is completed in this manner.

A method for manufacturing a CF substrate 14 will be described below.

First, a glass substrate 19b is prepared as a base of the CF substrate 14. A black matrix 27, which is made of a metal such as Cr, or a black resin, is formed on a predetermined region of the glass substrate 19b. This black matrix 27 is formed so as to face, e.g., the gate lines 16, the source lines 17, and the TFTs 21 of the TFT substrate 13.

Next, red, green, and blue color filters 28 are formed over the glass substrate 19b by using a red photosensitive resin, a green photosensitive resin, and a blue photosensitive resin.

Then, ITO is sputtered over the entire upper surface of the glass substrate 19b to form a counter electrode 29, and polyimide is applied to the counter electrode 29 to form an alignment film. The CF substrate 14 is completed in this manner.

The TFT substrate 13 and the CF substrate 14 manufactured as described above are positioned so as to face each other with spacers (not shown) interposed therebetween, and a liquid crystal material having negative dielectric anisotropy is enclosed between the TFT substrate 13 and the CF substrate 14, thereby producing an LCD panel 11. For example, diacrylate is added in advance to the liquid crystal material as a polymerizable component, where the amount of diacrylate is e.g., 0.3 wt % with respect to the liquid crystal material.

Figure 6:
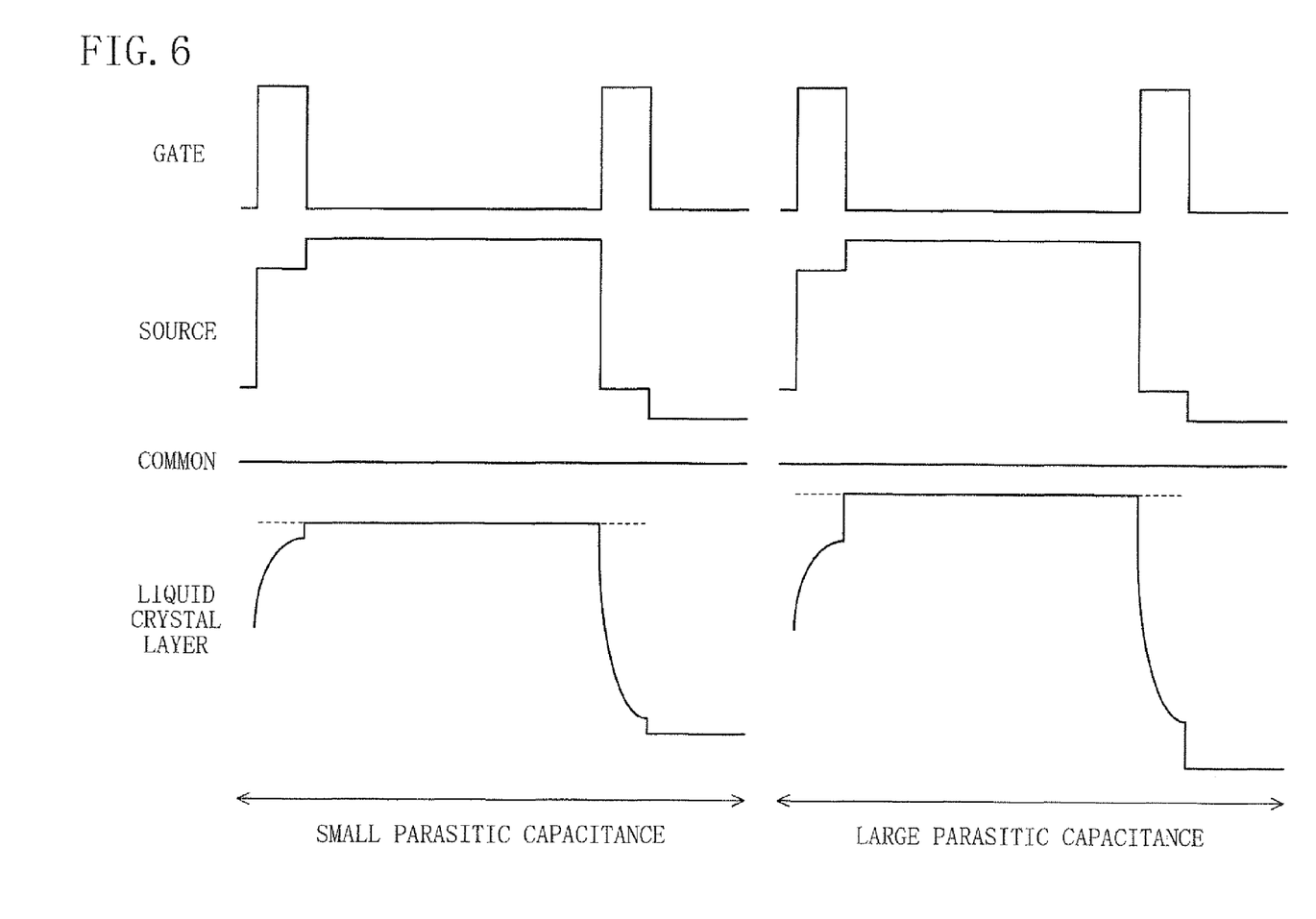
FIG. 6 is a diagram showing a comparison of an applied voltage between pixels having small parasitic capacitance, and pixels having large parasitic capacitance in a process of polymerizing a polymerizable component of a liquid crystal layer.

Then, a voltage is applied as shown in FIG. 6 to the LCD panel 11 to polymerize the polymerizable component. Specifically, as shown in FIG. 6, a signal is simultaneously applied to the gate lines 16 corresponding to all the pixels of the LCD panel 11. Moreover, a signal is simultaneously applied to the source lines 17 to drive all the pixels in the LCD panel 11 at the same time. This voltage application is performed so that the voltage that is applied to the liquid crystal layer while the gate is off (a gate-off period) is higher than the voltage that is applied to the liquid crystal layer while the gate is on (a gate-on period).

In this state, the LCD panel 11 is irradiated with ultraviolet (UV) light to form a polymer in the liquid crystal layer 15.

Then, polarizers 12a, 12b are positioned on both sides of the LCD panel 11 in the thickness direction, and a drive circuit and a backlight are attached. Thus, the LCD device 10 is completed.

(Principles of Reducing Display Unevenness in the LCD Device 10)

The principles of reducing display unevenness in the LCD device 10 will be described below.

When using a division exposure method or the like to perform a patterning process in manufacturing the TFT substrate 13 of the LCD panel 11, a displacement of a pattern or an overlay misalignment may occur at the boundary between division exposure regions due to manufacturing variation.

An example in which a displacement of a source line pattern has occurred as shown by arrow in FIG. 3 will be discussed below. FIG. 4 shows an equivalent circuit of a pixel, where reference character 40 indicates parasitic capacitance between the source line and the pixel electrode, reference character 41 indicates a liquid crystal capacitor, and reference character 42 indicates an auxiliary capacitor.

Figure 3:
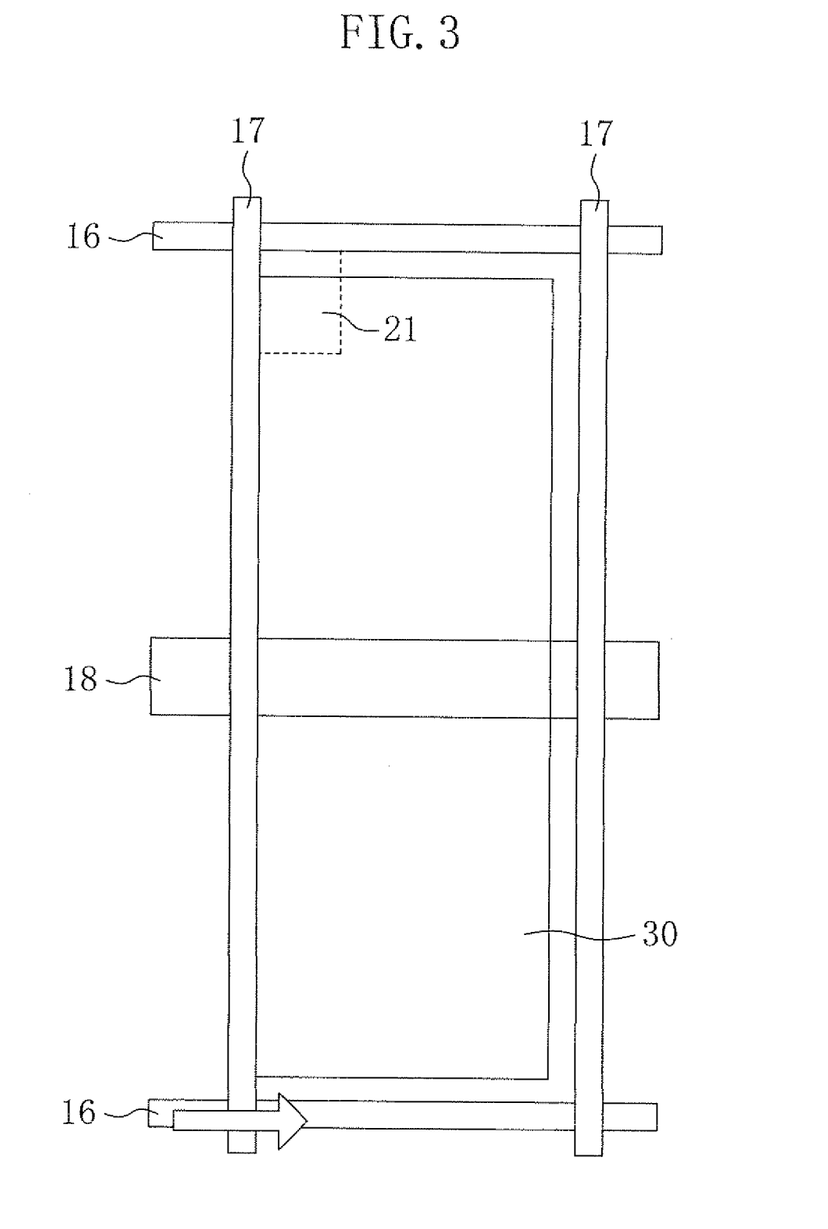
FIG. 3 is a plan view of a TFT substrate in which a displacement of a source line pattern has occurred.
Figure 4:
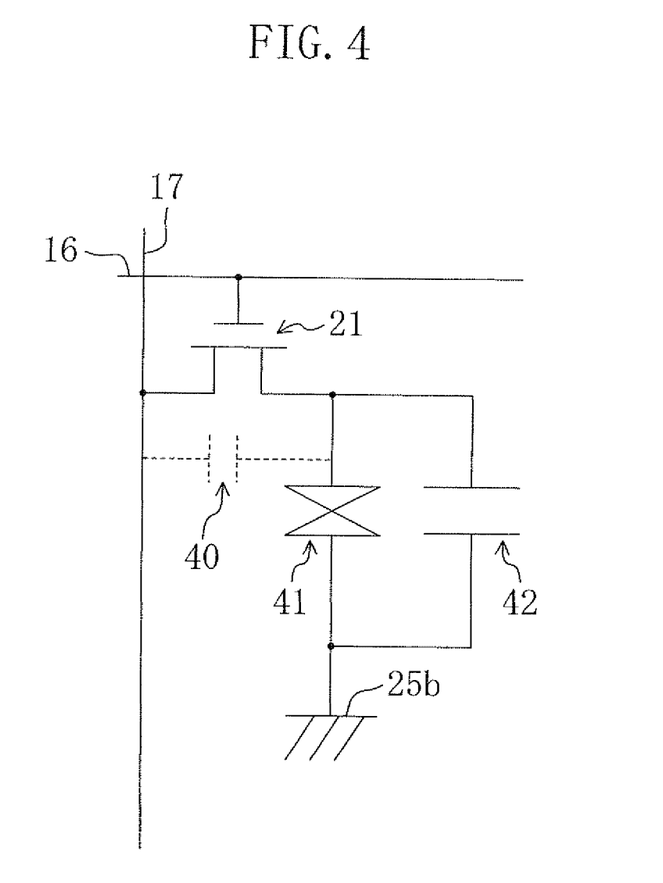
FIG. 4 is an equivalent circuit of a pixel according to an embodiment of the present invention.
Figure 5:
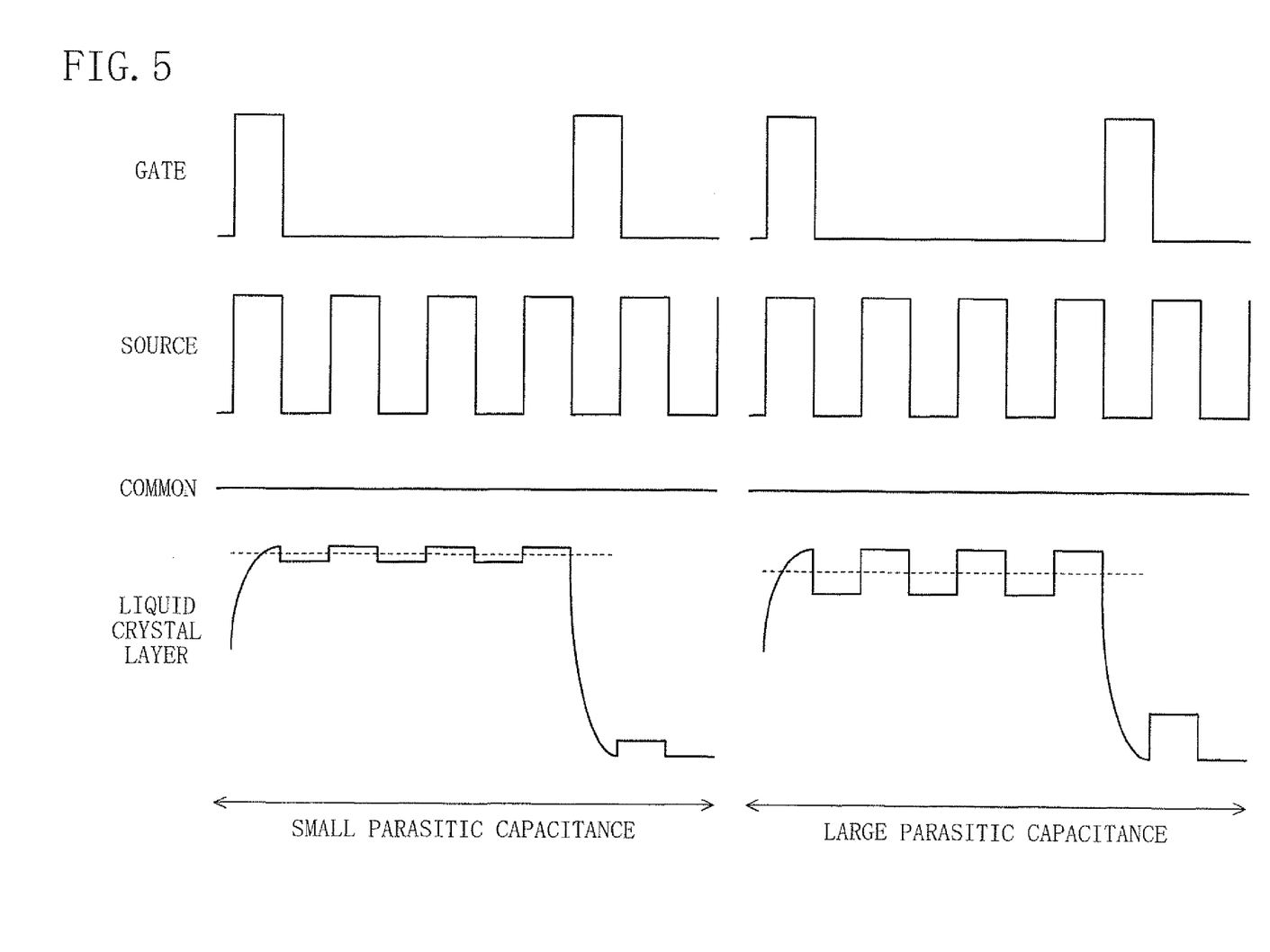
FIG. 5 is a diagram showing a comparison of an applied voltage between pixels having small parasitic capacitance, and pixels having large parasitic capacitance in a normal drive operation.
Figure 7:
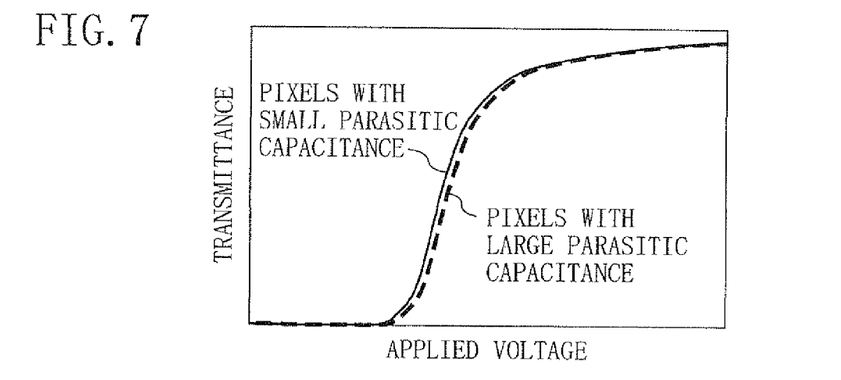
FIG. 7 is a diagram showing a comparison of T-V characteristics between pixels having small parasitic capacitance, and pixels having large parasitic capacitance in a normal drive operation.

When a source line pattern in the TFT substrate 13 is displaced as shown in FIG. 3, the parasitic capacitance 40 between the source line and the pixel electrode changes in this region. If the parasitic capacitance 40 between the source line and the pixel electrode varies between the pixel regions, a voltage that is applied to the liquid crystal layer varies between the pixel regions, and thus, the light transmittance of the pixels varies accordingly. If the light transmittance varies in this manner, that region is visually recognized as display unevenness. In this case, as shown in FIG. 7, T-V characteristics of pixels having large parasitic capacitance are shifted toward higher voltages in a normal drive operation as compared to T-V characteristics of pixels having small parasitic capacitance.

The present invention reduces display unevenness by taking advantage of the fact that the T-V characteristics change due to the parasitic capacitance. By applying the voltage as described below, the T-V characteristics are shifted in an opposite manner to that in the normal drive operation, and a monomer is polymerized in this state. By this polymerization, the tilt direction of the liquid crystal molecules is defined according to this shift of the T-V characteristics (the shift opposite to that in the normal drive operation). In the subsequent normal drive operation, the shift of the T-V characteristics caused by the process of polymerizing the monomer, and the shift of the T-V characteristics in the normal drive operation cancel each other. The shift of the T-V characteristics between the regions having different parasitic capacitance values is reduced in this manner, whereby display unevenness is reduced.

Figure 8:
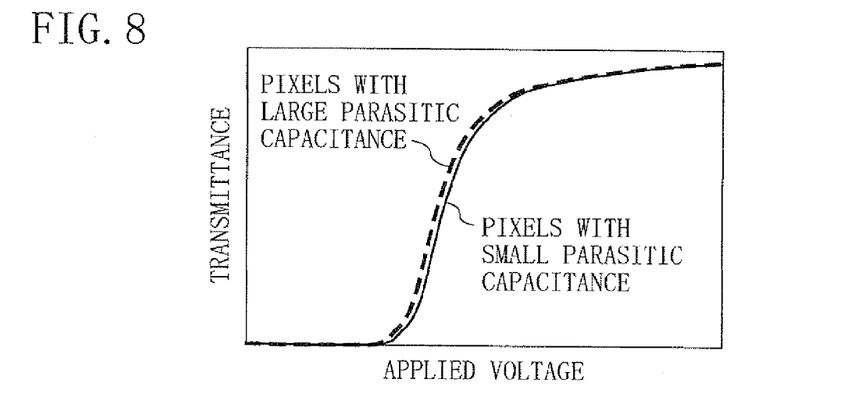
FIG. 8 is a diagram showing a comparison of T-V characteristics between pixels having small parasitic capacitance, and pixels having large parasitic capacitance in a process of polymerizing a polymerizable component of a liquid crystal layer.
Figure 9:
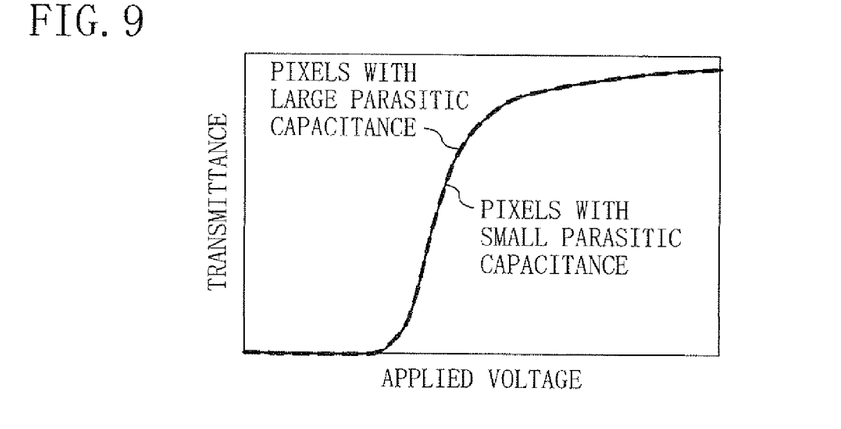
FIG. 9 is a diagram showing a comparison of T-V characteristics between pixels having small parasitic capacitance, and pixel having large parasitic capacitance in a normal drive operation of the LCD device according to the embodiment of the present invention.

A specific method for applying a voltage will be described. First, as shown in FIG. 6, a signal is simultaneously applied to the gate lines 16 corresponding to all the pixels of the LCD panel 11. Moreover, a signal is simultaneously applied to the source lines 17 to drive all the pixels in the LCD panel 11 at the same time. At this time, the voltage that is applied to the liquid crystal layer during a gate-off period is higher than the voltage that is applied to the liquid crystal layer during a gate-on period. Thus, as shown in FIG. 8, the T-V characteristics of pixels having large parasitic capacitance are shifted toward lower voltages as compared to the T-V characteristics of pixels having small parasitic capacitance. That is, the T-V characteristics can be shifted in an opposite manner to that in the normal drive operation. If the monomer is polymerized under such voltage application conditions, the tilt direction of the liquid crystal molecules is defined according to the shift of the T-V characteristics caused by this voltage application (that is, the shift opposite to that in the normal drive operation). Thus, in the subsequent normal drive operation, the shift of the T-V characteristics in the normal drive operation, and the shift of the T-V characteristics caused by the process of polymerizing the monomer with the voltage being applied as described above cancel each other. As a result, display unevenness resulting from the difference in parasitic capacitance 40 can be satisfactorily reduced.

According to the LCD device 10 of the embodiment and the manufacturing method thereof, it is not necessary to provide a margin to allow for an overlay misalignment and the like. Thus, the LCD device 10 has a satisfactory aperture ratio.

INDUSTRIAL APPLICABILITY

As described above, the present invention is useful for LCD devices and manufacturing methods thereof.

The invention claimed is:

1. A liquid crystal display device, comprising:
   first and second substrates positioned so as to face each other;
   a liquid crystal layer interposed between the first and second substrates, and containing a polymerizable component that is polymerized by light or heat;
   a plurality of pixel electrodes formed over the first substrate, for controlling a tilt angle of liquid crystal molecules on a pixel region-by-pixel region basis according to an applied voltage; and
   a counter electrode formed over the second substrate, and positioned so as to face the plurality of pixel electrodes, wherein
   the polymerizable component of the liquid crystal layer is polymerized with a predetermined voltage being applied to a region corresponding to those pixels whose transmittance-drive voltage characteristics are shifted toward higher voltages in a normal drive operation, where the predetermined voltage is applied so that the transmittance-drive voltage characteristics are shifted toward lower voltages by an amount equal to or larger than an amount of the shift toward higher voltages.

2. The liquid crystal display device of claim 1, wherein
   the first substrate includes TFT devices electrically connected to the pixel electrodes, respectively, and gate lines and source lines for driving the pixel electrodes via the TFT devices, respectively, and
   the polymerizable component of the liquid crystal layer is polymerized with a voltage being applied to the liquid crystal layer to drive the pixel electrodes, where the voltage application is performed by periodically and simultaneously applying a pulsed voltage to the gate lines corresponding to all of the plurality of pixel electrodes to turn on/off the plurality of TFT devices simultaneously, and the voltage that is applied to the liquid crystal layer during a gate-off period is higher than the voltage that is applied to the liquid crystal layer during a gate-on period.

3. A method for manufacturing a liquid crystal display device, comprising the steps of:
   preparing first and second substrates positioned so as to face each other, a liquid crystal layer interposed between the first and second substrates, and containing a polymerizable component that is polymerized by light or heat, a plurality of pixel electrodes formed over the first substrate, for controlling a tilt angle of liquid crystal molecules on a pixel region-by-pixel region basis according to an applied voltage, and a counter electrode formed over the second substrate, and positioned so as to face the plurality of pixel electrodes; and
   polymerizing the polymerizable component of the liquid crystal layer with a predetermined voltage being applied to a region corresponding to those pixels whose transmittance-drive voltage characteristics are shifted toward higher voltages in a normal drive operation, where the predetermined voltage is applied so that the transmittance-drive voltage characteristics are shifted toward lower voltages by an amount equal to or larger than an amount of the shift toward higher voltages.

4. The method of claim 3, wherein
the first substrate includes TFT devices electrically connected to the pixel electrodes, respectively, and gate lines and source lines for driving the pixel electrodes via the TFT devices, respectively, and
the polymerizable component of the liquid crystal layer is polymerized with a voltage being applied to the liquid crystal layer to drive the pixel electrodes, where the voltage application is performed by periodically and simultaneously applying a pulsed voltage to the gate lines corresponding to all of the plurality of pixel electrodes to turn on/off the plurality of TFT devices simultaneously, and the voltage that is applied to the liquid crystal layer during a gate-off period is higher than the voltage that is applied to the liquid crystal layer during a gate-on period.

* * * * *